March 17, 1970     R. W. FOSTER-PEGG     3,500,642
MULTIPLE TURBINE EXHAUST SYSTEM
Filed July 3, 1968
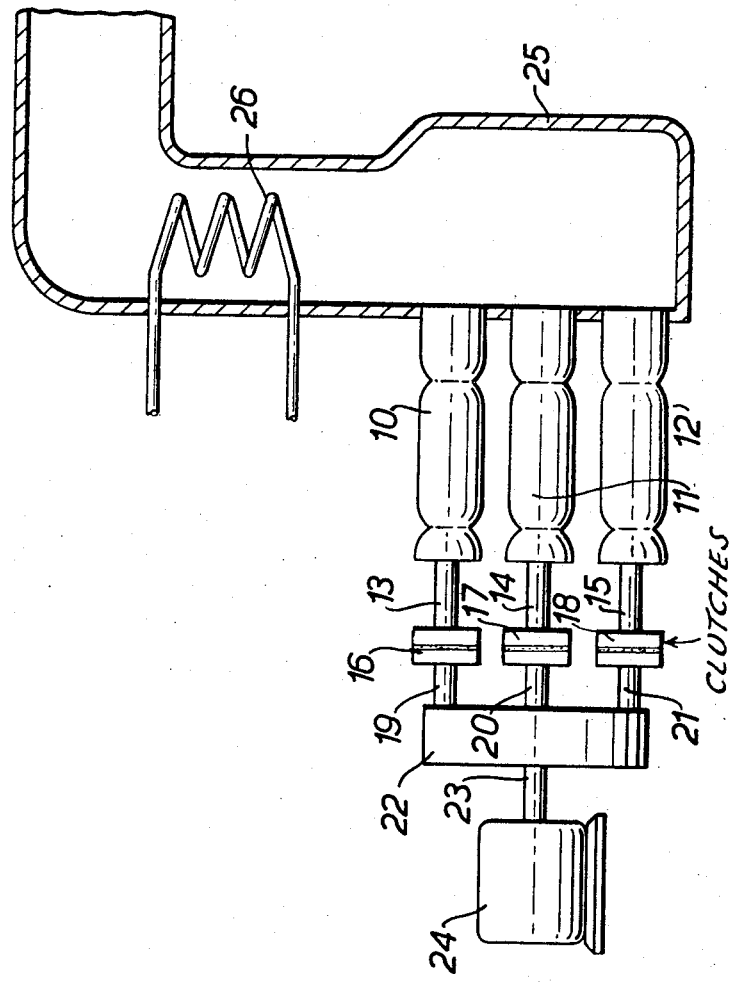

United States Patent Office 3,500,642
Patented Mar. 17, 1970

3,500,642
MULTIPLE TURBINE EXHAUST SYSTEM
Richard W. Foster-Pegg, Warren, Pa., assignor to Struthers Energy Systems, Inc., a corporation of Delaware
Filed July 3, 1968, Ser. No. 742,468
Claims priority, application Great Britain, July 11, 1967, 31,781/67
Int. Cl. F01d 13/00; F01k 23/16; F02c 7/02
U.S. Cl. 60—102                     2 Claims

ABSTRACT OF THE DISCLOSURE

A number of gas turbines provide power through clutches and a gear box, the turbines exhausting into a common plenum chamber, the clutches, when disengaged, providing sufficient drag to slowly rotate non-working turbines sufficiently to draw air therethrough and prevent any counter flow of exhaust gases.

BACKGROUND OF THE INVENTION

A multiple gas turbine power package is light, easily moved, and not overly expensive for certain applications. Such a power package is flexible and efficient in that individual gas turbines need only be activated as required to satisfy given load conditions.

Each gas turbine may exhaust into a common exhaust plenum from which exhaust heat may be recovered or which may muffle sound, but from which exhaust gases pass into the atmosphere. If only one or more of the turbines of a gas turbine generator package is operating, pressure in the common exhaust plenum will be higher than atmospheric so that hot exhaust gases will tend to flow in reverse through non-operating turbines. These hot gases flowing in reverse through stationary turbines can damage their intakes, foul the enclosure, and do considerable other harm.

SUMMARY OF THE INVENTION

The gas turbines in a power package provide power through clutches and a gear box, the turbines exhausting into a common plenum chamber, the clutches, when disengaged, providing sufficient drag to slowly rotate non-working turbines sufficiently to draw air therethrough and prevent any counterflow of exhaust gases. The exhaust system of this invention is simple, efficient, and requires no extra equipment.

BRIEF DESCRIPTION OF THE DRAWING

The figure is a schematic diagram showing three turbines connected to a generator and exhausting into a common plenum chamber, the plenum chamber being shown in section.

DESCRIPTION OF THE PREFERRED EMBODIMENT

Three gas turbines 10, 11, and 12 have shafts 13, 14 and 15 which have the clutches 16, 17 and 18 connected thereto. The clutches 16, 17 and 18 may be activated to drive the shafts 19, 20, and 21 of gear box 22. Gear box 22 has an output shaft 23 which drives generator 24. According to load requirements, any one, any two, or all three of the turbines 10, 11, and 12 may be operated to drive generator 24 through appropriate clutches 16, 17, and 18. Non-working gas turbines would have their respective clutches disengaged.

The turbines 10, 11, and 12 could be any industrial gas turbine engines such as the Allison Model 501–K5. Gear box 22 would rotatably connect shafts 19, 20, 21 and 23. The clutches 16, 17, and 18 may be oil bath multiple disk clutches which may be incorporated in the gear box 22.

The gas turbines 10, 11, and 12 exhaust into a common plenum chamber 25 which may pass the exhaust gases to a waste heat recovery unit 26, a muffler (not shown) or the like. Pressure in the common exhaust plenum chamber 25 will be higher than atmospheric so that hot exhaust gases will tend to flow in reverse through any non-operating turbines 10, 11, or 12. As has been stated, this reverse flow can cause considerable damage.

If the clutches 16, 17, and 18 are provided with a slight drag, as may be provided by oil introduced between the clutch plates, operating turbines will slowly rotate non-operating turbines through gear box 22 with small power loss so that the non-operating turbines draw air therethrough. This prevents any counter flow of hot exhaust gases from operating turbines through non-operating turbines.

One great advantage of this invention is that it prevents the counterflow of exhaust gases without requiring special heat resisting valves, closures, ducting, or the like.

While this invention has been shown and described in the best form known, this is purely exemplary and modifications may be made without departing from the spirit and scope of the invention except as it may be more limited in the appended claims.

What is claimed is:

1. A gas turbine power package comprising, in combination, at least two selectively operated gas turbines, a common plenum chamber into which exhaust gases from said turbines pass, a gear box providing a common drive from said gas turbines, and a clutch selectively connecting each of said turbines to said gear box, a clutch connecting each operating gas turbine to said gear box when engaged, and said clutch providing drag when disengaged to rotate at least one non-operating gas turbine and draw air therethrough preventing the reverse flow of exhaust gases from said plenum chamber through said non-operating turbine.

2. The combination according to claim 1 with the addition of a generator driven by said gear box, said clutch connecting said turbine to said gear box according to the load drawn from said generator.

References Cited

UNITED STATES PATENTS 2,960,821   11/1960   Scherl _____ 60—39.15 XR

EDGAR W. GEOGHEGAN, Primary Examiner

R. R. BUNEVICH, Assistant Examiner

U.S. Cl. X.R.

60—39.15